(12) United States Patent
Lee et al.

(10) Patent No.: US 8,773,147 B2
(45) Date of Patent: Jul. 8, 2014

(54) CAPACITIVE TOUCH SENSING DEVICE BY DETECTING INDUCED ELECTRIC FIELD

(75) Inventors: Hsiang-Yu Lee, New Taipei (TW); Ping-Tsun Lin, Taipei (TW)

(73) Assignee: Invention Element Inc., Taoyuan County (TW)

( * ) Notice: Subject to any disclaimer, the term of this patent is extended or adjusted under 35 U.S.C. 154(b) by 310 days.

(21) Appl. No.: 13/276,100

(22) Filed: Oct. 18, 2011

(65) Prior Publication Data

US 2012/0092028 A1    Apr. 19, 2012

(30) Foreign Application Priority Data

Oct. 19, 2010   (TW) ................................. 99135527 A

(51) Int. Cl.
*G01R 27/26*    (2006.01)
(52) U.S. Cl.
USPC ...... 324/658; 324/686; 324/750.17; 324/519; 324/754.28; 324/76.66; 178/18.06
(58) Field of Classification Search
USPC ............... 324/658, 686, 750.17, 519, 754.28, 324/76.66; 178/18.06
See application file for complete search history.

(56) References Cited

U.S. PATENT DOCUMENTS

| | | | | |
|---|---|---|---|---|
| 4,555,752 A | * | 11/1985 | Kurosawa | 363/68 |
| 5,650,597 A | * | 7/1997 | Redmayne | 178/18.06 |
| 6,362,632 B1 | * | 3/2002 | Livingston | 324/661 |
| 6,476,620 B2 | * | 11/2002 | Kato et al. | 324/662 |
| 7,756,662 B2 | * | 7/2010 | Tokita | 702/97 |
| 2005/0002423 A1 | * | 1/2005 | Lambrecht et al. | 370/503 |
| 2008/0128182 A1 | * | 6/2008 | Westerman et al. | 178/18.06 |
| 2010/0300773 A1 | * | 12/2010 | Cordeiro et al. | 178/18.06 |

* cited by examiner

*Primary Examiner* — Patrick Assouad
*Assistant Examiner* — Sean Curtis
(74) *Attorney, Agent, or Firm* — Muncy, Geissler, Olds & Lowe, P.C.

(57) ABSTRACT

A capacitive touch sensing device by detecting induced electric field includes a differential amplifier, a resistor and a signal judgment circuit. The differential amplifier is electrically connected to a touch sensor. The resistor is electrically connected to a first input end and a second input end of the differential amplifier. The signal judgment circuit is electrically connected to an output end of the differential amplifier. As the touch sensor receives an induced electric field signal, the induced electric field signal is amplified by the differential amplifier and the signal judgment circuit determines whether the amplified induced electric field signal is a touch input.

14 Claims, 12 Drawing Sheets ent of the invention;

CAPACITIVE TOUCH SENSING DEVICE BY DETECTING INDUCED ELECTRIC FIELD

CROSS REFERENCE TO RELAYED APPLICATION

This application claims the benefits of the Taiwan Patent Application Serial Number 099135527, filed on Oct. 19, 2010, the subject matter of which is incorporated herein by reference.

BACKGROUND OF THE INVENTION

1. Field of the Invention

The present invention relates to a capacitive touch sensing device and, more particularly, to a capacitive touch sensing device by detecting induced electric field.

2. Description of Related Art

Currently, in the research and development of a capacitive touch sensing device, the major affecting factor of self-capacitance lies in the electric field from a human body which is affected by the electric field from the earth. Since an electric field has a positive one and a negative one, it will create differences in increasing or decreasing of capacitance with respect to the self-capacitance, resulting in instability in measuring and being mistaken as noise to deal with.

On the other hand, the size and distance of a contact point on a capacitive touch sensing device will affect the increasing of the self-capacitance and will also affect the magnitude of an induced electric field. In the prior art, it utilizes the feature of capacitance increment to measure if there is a contact, while the ratio of capacitance increment is essentially dominated by the electric circuit design, with a variation approximately 1-2%. However, such variation is far smaller than that of the electric field. Therefore, if the electric field from a human body and the electric field from the earth are treated as noises, it will tremendously affect the accuracy and stability of the capacitive touch sensing device.

Therefore, it is desirable to provide an improved capacitive touch sensing device by detecting induced electric field to mitigate and/or obviate the aforementioned problems.

SUMMARY OF THE INVENTION

The object of the present invention is to provide a capacitive touch sensing device by detecting induced electric field, capable of determining if there is a touch input, via measurement of the variation quantity of the electric field.

To achieve the object, the provided capacitive touch sensing device by detecting induced electric field comprises: a differential amplifier having a first input end, a second input end and an output end; a resistor, one end electrically connected to the first input end and the other end electrically connected to the second input end of the differential amplifier; and a signal judgment circuit electrically connected to the output end of the differential amplifier, wherein the first input end of the differential amplifier is electrically connected to a touch sensor, the second input end of the differential amplifier is connected to the circuit ground, and as the touch sensor receives an induced electric field signal, the differential amplifier amplifies the induced electric field signal and the induced electric field signal after amplified is then determined by the signal judgment circuit.

The capacitive touch sensing device further includes a capacitor, electrically connected to the first input end and the second input end of the differential amplifier for noise filtration. Besides, the resistor of the capacitive touch sensing device is preferably a high impedance resistor. The differential amplifier is preferably provided with high input impedance. The touch sensor is a touch sensing button, a slider, a shuttle, ITO wires, ITO conductive surface or the like.

Furthermore, the capacitive touch sensing device according to the invention may expand from a single point touch detection to a two-dimension plane touch detection. To accomplish the above object, there is a capacitive touch sensing device by detecting induced electric field, which comprises: a multiplexer; a plurality of first conductive wires arranged sequentially along a first direction, each being electrically connected to the multiplexer; a plurality of second conductive wires arranged sequentially along a second direction, each being electrically connected to the multiplexer; a differential amplifier electrically connected to the multiplexer; and a signal judgment circuit electrically connected to the differential amplifier, wherein the plurality of first conductive wires and the plurality of second conductive wires are electrically connected to the differential amplifier via the multiplexer, and as one of the plurality of first conductive wires and one of the plurality of second conductive wires receive an induced electric field signal, the multiplexer being connected thereto transfers the induced electric field signal to the differential amplifier for amplification and the amplified induced electric field signal is determined by the signal judgment circuit. Preferably, the first direction and the second direction are orthogonal.

In addition, the capacitive touch sensing device provided by the invention measures the touch position according to the induced electric field. Therefore, even if a user wears gloves, it may accurately measure the touch position.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
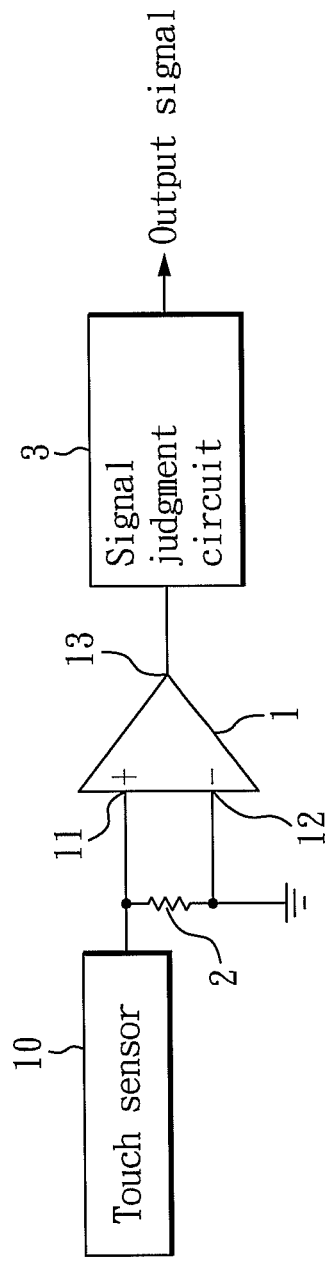
FIG. 1 is a first circuit structure diagram of the capacitive touch sensing device in accordance with a preferred embodiment of the invention.

With reference to FIG. 1, it is shown a first circuit structure diagram of the capacitive touch sensing device in accordance with a preferred embodiment of the invention, which comprises a differential amplifier 1, a resistor 2 and a signal judgment circuit 3. The differential amplifier 1 includes a first input end 11, a second input end 12 and an output end 13. The first input end 11 is electrically connected to a touch sensor 10 and the second input end 12 is connected to circuit ground. In this preferred embodiment, the first input end 11 is a positive input end and the second input end 12 is a negative input end. Preferably, the touch sensor 10 is a touch sensing button, a slider, a shuttle or a touch panel. The two ends of the resistor 2 are respectively electrically connected to the first input end 11 and the second input end 12 of the differential amplifier 1. Preferably, the resistor 2 is a high impedance resistor. The signal judgment circuit 3 is electrically connected to the output end 13 of the differential amplifier 1. As the touch sensor 10 receives an induced electric field signal, the induced electric field signal is amplified by the differential amplifier 1 and the amplified induced electric field signal is determined by the signal judgment circuit 3. Further, please refer to FIG. 2. In the invention, a capacitor 4 may be added to filtrate noise of the induced electric field signal, making the waveform of the touch signal output by the signal judgment circuit 3 more complete.

The signal judgment circuit 3 may be implemented to multiple options. In the invention, three ways of implementing the signal judgment circuit 3 will be exampled and explained hereinafter.

Figure 3A:
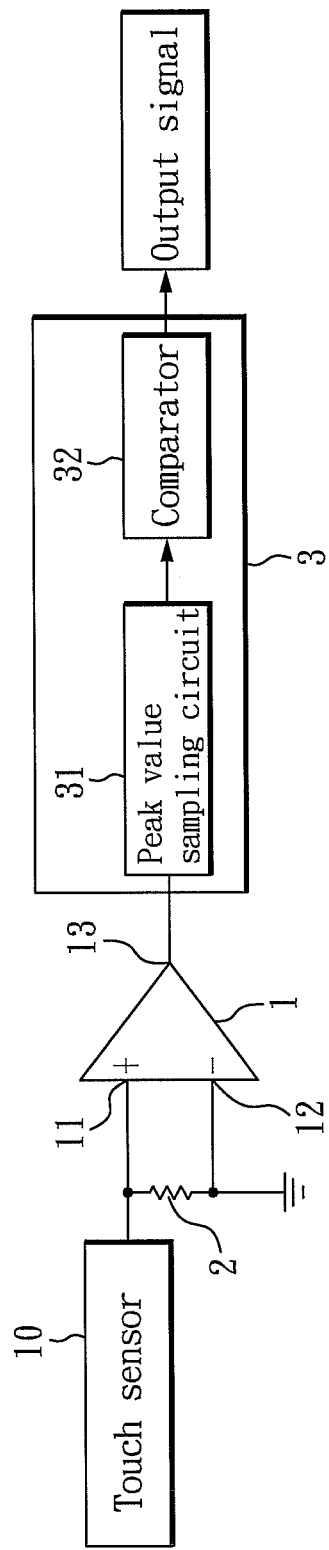
FIG. 3(a) is a third circuit structure diagram of the capacitive touch sensing device in accordance with a preferred embodiment of the invention.
Figure 3B:
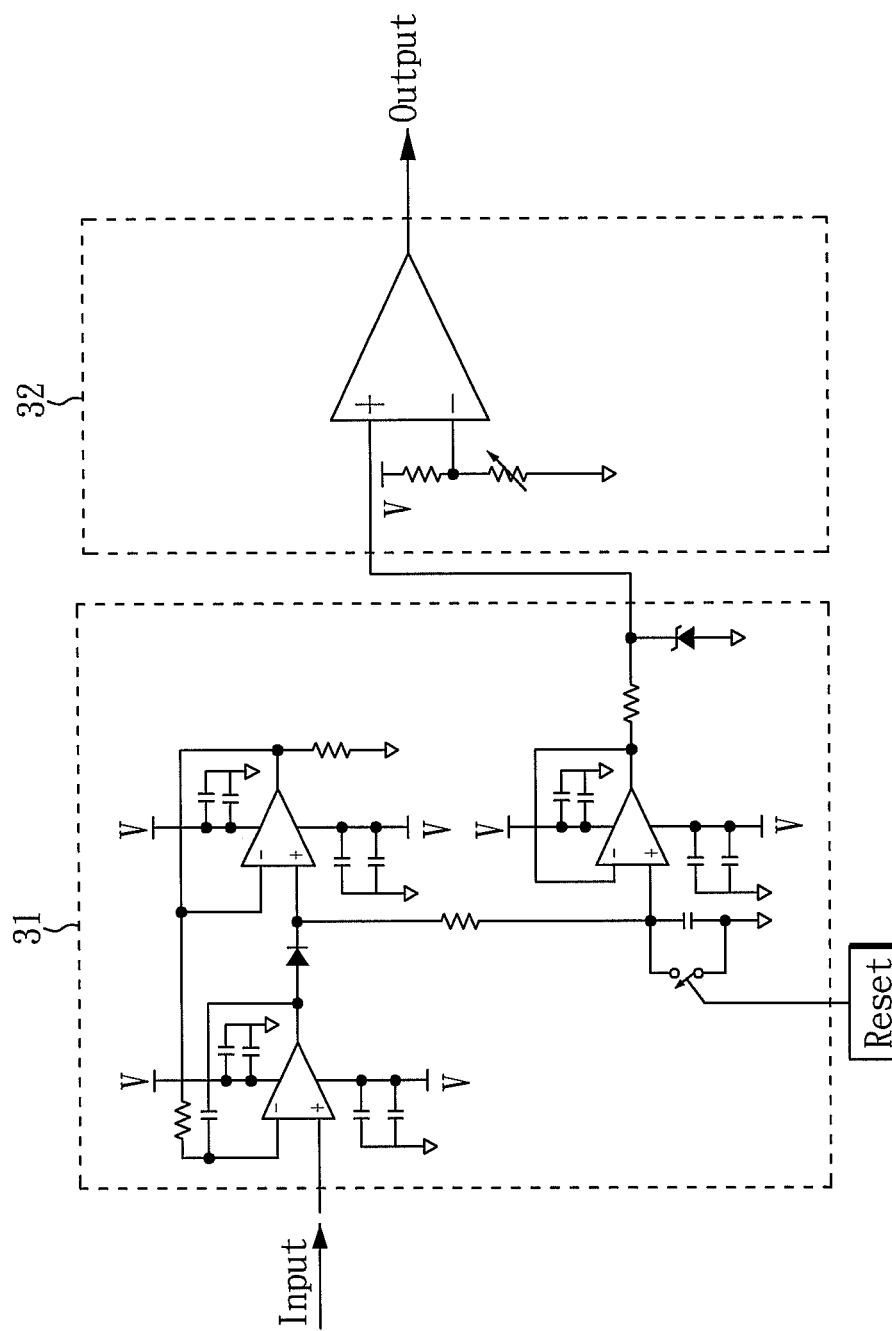
FIG. 3(b) is a physical circuit diagram of FIG. 3(a) of the capacitive touch sensing device in accordance with a preferred embodiment of the invention.

Firstly, for the first implementation of the signal judgment circuit 3, please refer to FIG. 3(a). The signal judgment circuit 3 includes a peak value sampling circuit 31 and a comparator 32. The peak value sampling circuit 31 is electrically connected to the output end 13 of the differential amplifier 1 to proceed with peak value sampling of the amplified induced electric field signal, and the comparator 32 is electrically connected to the peak value sampling circuit 31 for comparing the amplified induced electric field signal after peak value sampling with a reference voltage. If the amplified induced electric field signal after peak value sampling is larger than the reference voltage, it then output a signal. The physical circuit diagram of implementing the signal judgment circuit 3, including the peak value sampling circuit 31 and the comparator 32, is shown in FIG. 3(b).

Figure 4A:
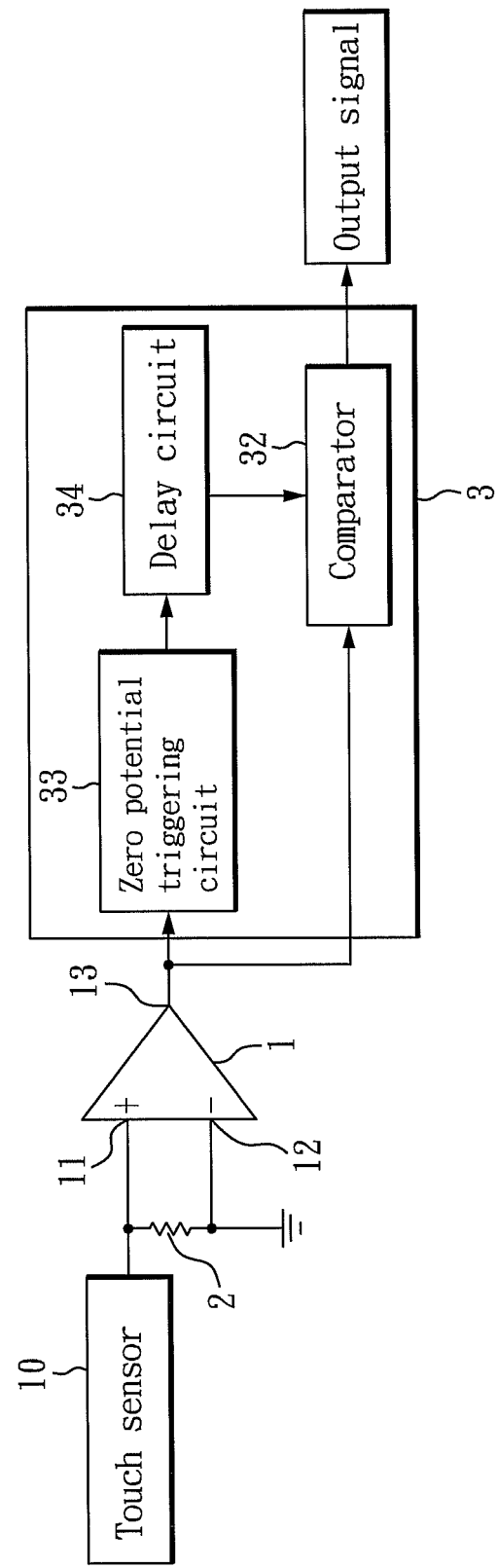
FIG. 4(a) is a fourth circuit structure diagram of the capacitive touch sensing device in accordance with a preferred embodiment of the invention.
Figure 4B:
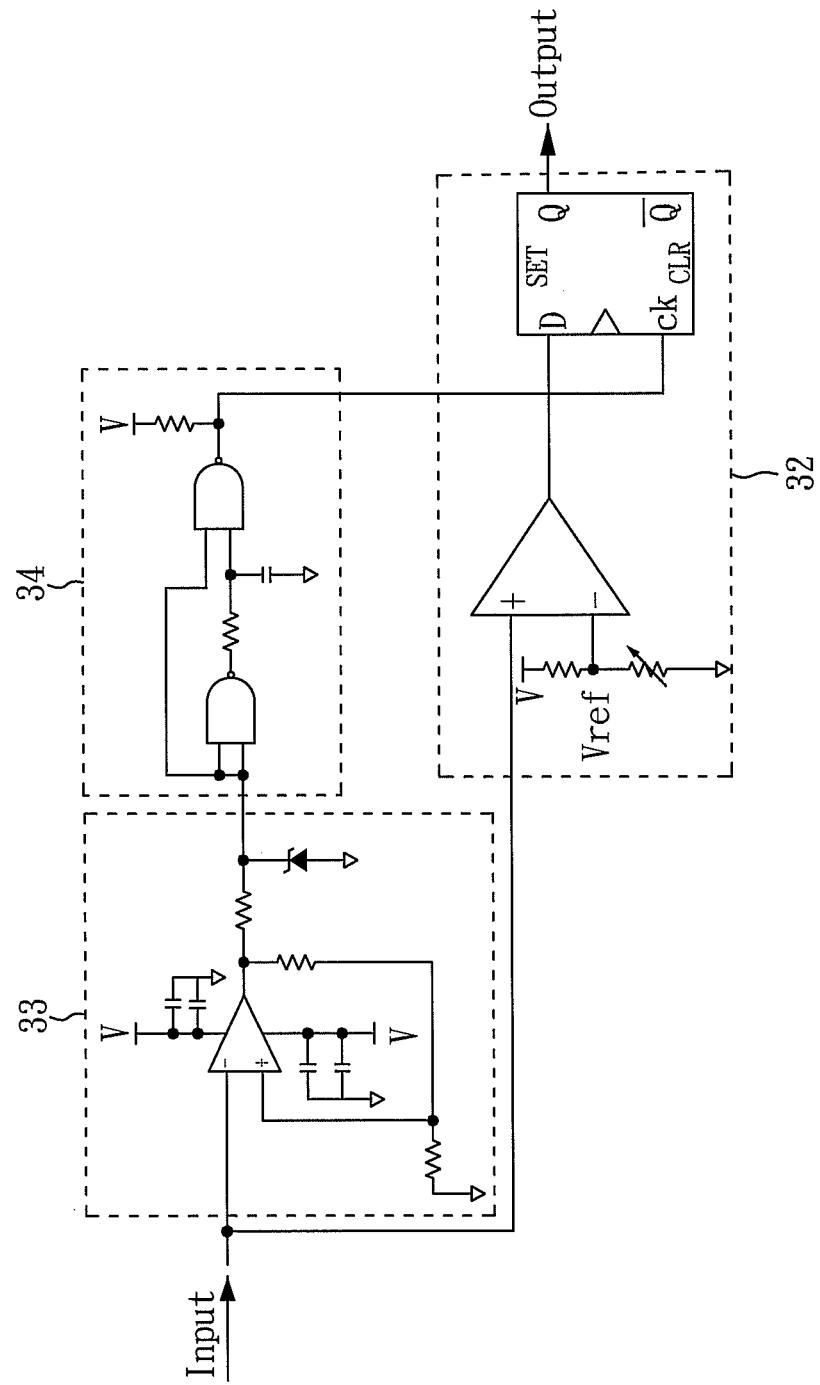
FIG. 4(b) is a physical circuit diagram of FIG. 4(a) of the capacitive touch sensing device in accordance with a preferred embodiment of the invention.

Then, for the second implementation of the signal judgment circuit 3, please refer to FIG. 4(a). The signal judgment circuit 3 includes a zero potential triggering circuit 33, a delay circuit 34 and a comparator 32. The zero potential triggering circuit 33 is electrically connected to the output end 13 of the differential amplifier 1, in which, as the amplified induced electric field signal is at a zero potential, the zero potential triggering circuit 33 generates a triggering signal. The delay circuit 34 is electrically connected to the zero potential triggering circuit 33 for correspondingly receiving the triggering signal and delaying the triggering signal a period of time then output to the comparator 32. Upon receiving the delayed triggering signal from the delay circuit 34, the comparator 32 compares the amplified induced electric field signal with a reference voltage. If the amplified induced electric field signal is larger than the reference voltage, it then output a signal. The physical circuit diagram of implementing the signal judgment circuit 3, including the zero potential triggering circuit 33, the delay circuit 34 and the comparator 32, is shown in FIG. 4(b).

Figure 5A:
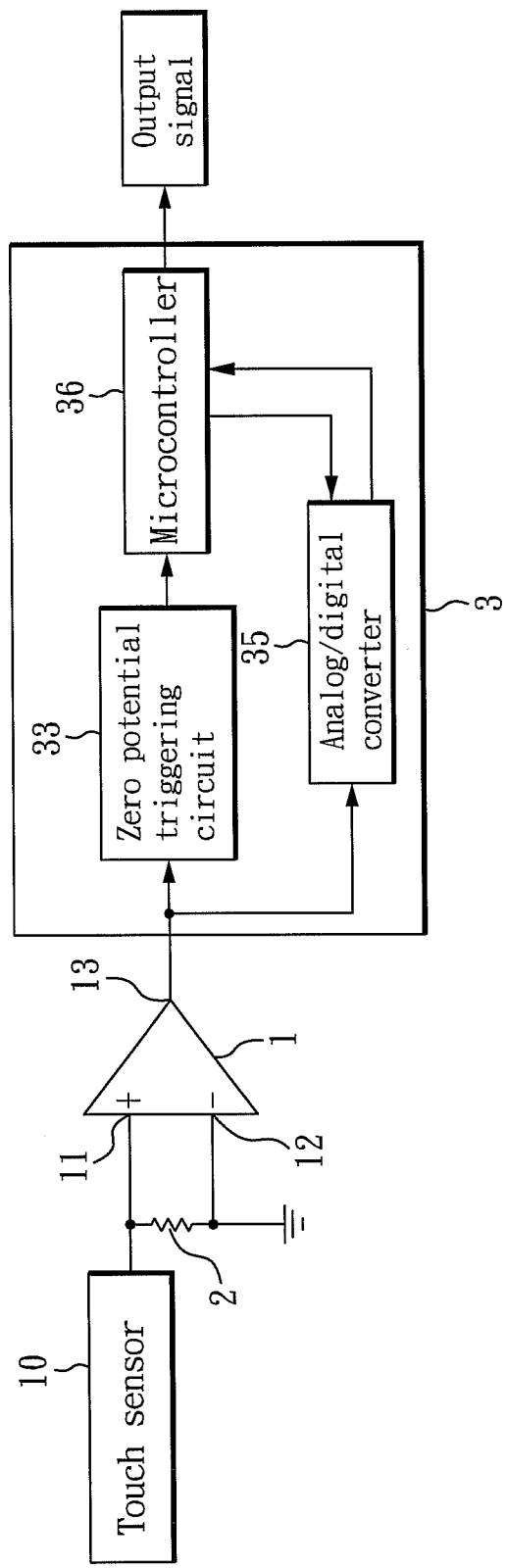
FIG. 5(a) is a fifth circuit structure diagram of the capacitive touch sensing device in accordance with a preferred embodiment of the invention.
Figure 5B:
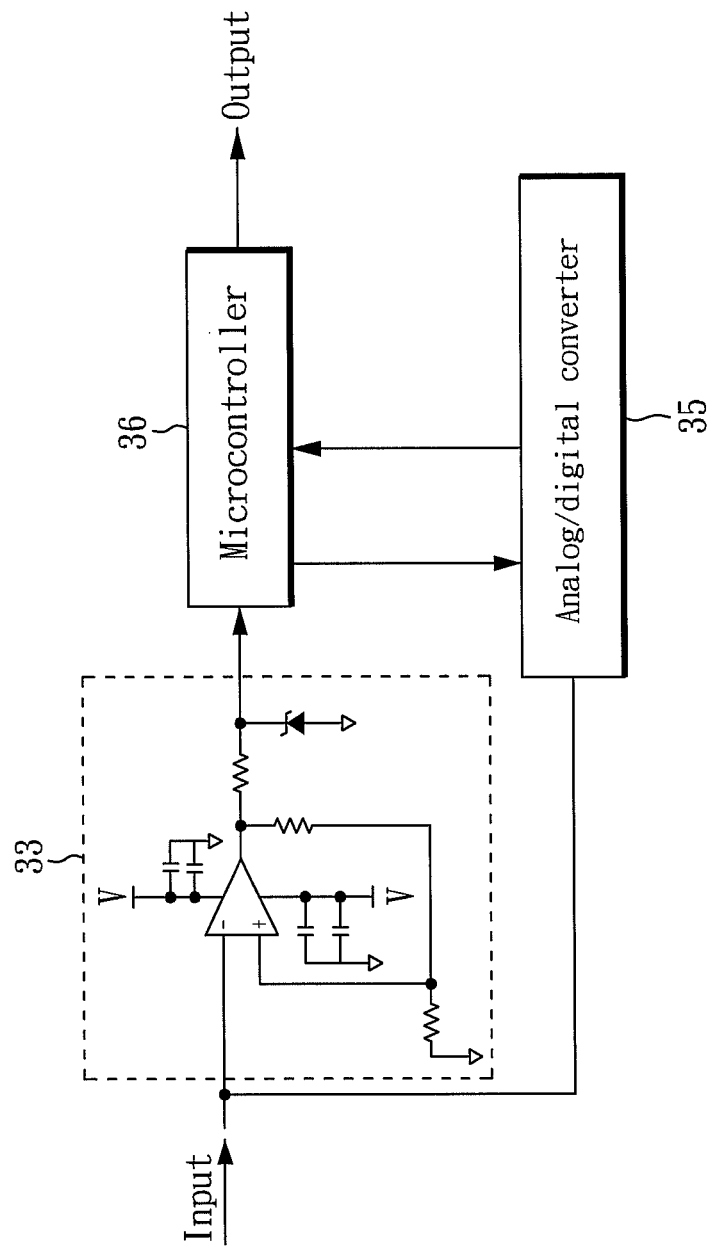
FIG. 5(b) is a physical circuit diagram of FIG. 5(a) of the capacitive touch sensing device in accordance with a preferred embodiment of the invention.

Subsequently, for the third implementation of the signal judgment circuit 3, please refer to FIG. 5(a). The signal judgment circuit includes: a zero potential triggering circuit 33, an analog/digital converter 35 and a microcontroller 36. The zero potential triggering circuit 33 is electrically connected to the output end 13 of the differential amplifier 1, in which, as the amplified induced electric field signal is at a zero potential, the zero potential triggering circuit 33 generates a triggering signal. The microcontroller 36 is electrically connected to the zero potential triggering circuit 33 for receiving the triggering signal and correspondingly output a delayed triggering signal. The analog/digital converter 35 is electrically connected to the output end 13 of the differential amplifier 1 and to the microcontroller 36, in which, as the analog/digital converter 35 receives the delayed triggering signal from the microcontroller 36, it correspondingly transfers a converted digital value of the induced electric field signal to the microcontroller 36. After receiving the digital value of the induced electric field signal after sampling, the microcontroller 36 compares the digital value of the amplified induced electric field signal with a reference value after sampling. If the digital value of the amplified induced electric field signal after sampling is larger than the reference value, it then output a signal. The physical circuit diagram of implementing the signal judgment circuit 3, including the zero potential triggering circuit 33, the analog/digital converter 35 and a microcontroller 36, is shown in FIG. 5(b).

Figure 2:
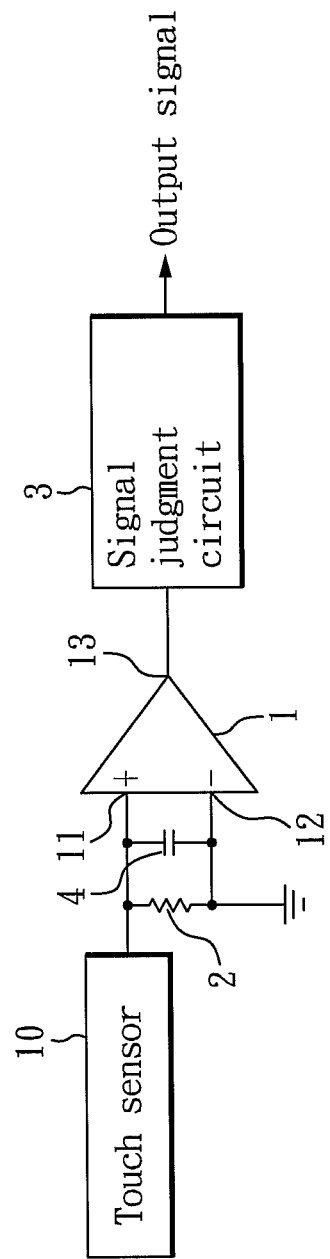
FIG. 2 is a second circuit structure diagram of the capacitive touch sensing device in accordance with a preferred embodiment of the invention.
Figure 6A:
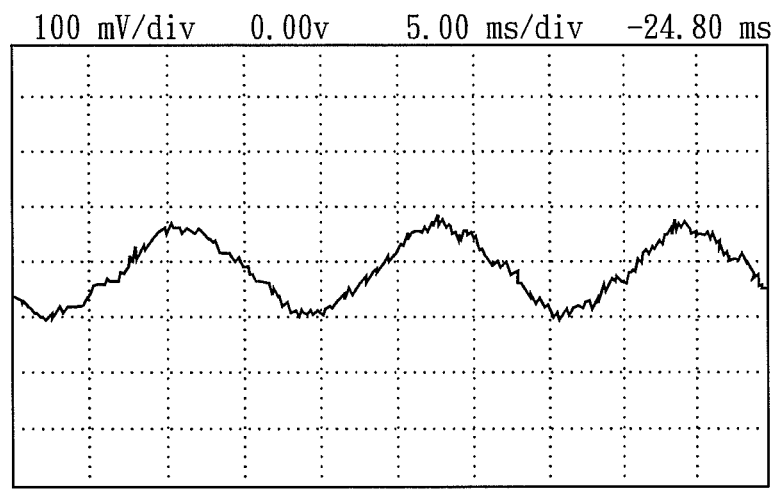
FIG. 6(a) is a first waveform diagram of the capacitive touch sensing device in accordance with a preferred embodiment of the invention.
Figure 6B:
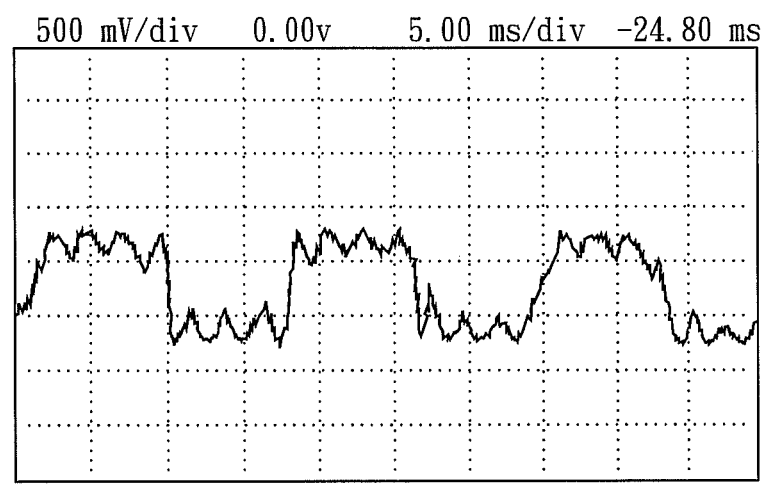
FIG. 6(b) is a second waveform diagram of the capacitive touch sensing device in accordance with a preferred embodiment of the invention.
Figure 7A:
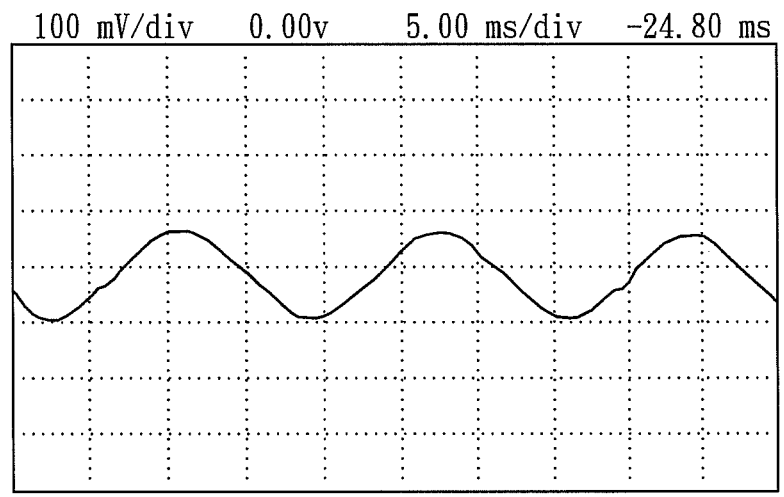
FIG. 7(a) is a third waveform diagram of the capacitive touch sensing device in accordance with a preferred embodiment of the invention.
Figure 7B:
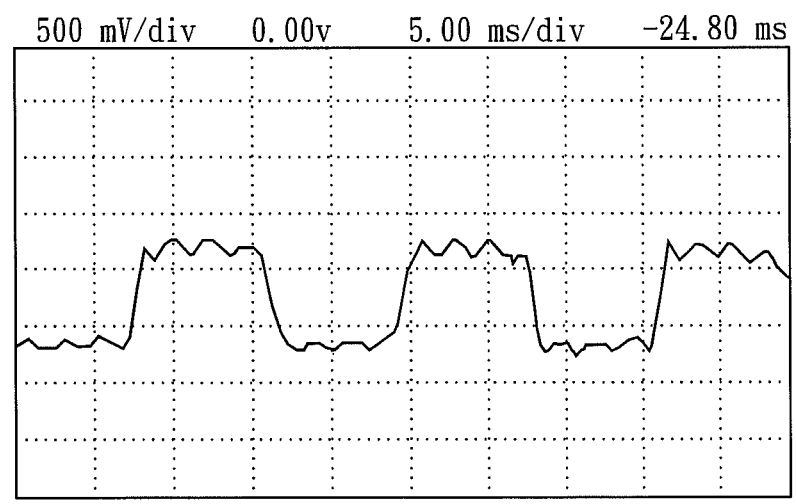
FIG. 7(b) is a fourth waveform diagram of the capacitive touch sensing device in accordance with a preferred embodiment of the invention.

Hereinafter, there are provided waveform diagrams to explain the practical effects of the present invention. Please refer to FIGS. 6(a) and 6(b). FIG. 6(a) is a waveform diagram of an induced electric field, it shows while without any physical contact, of which a touch sensor 10 is a touch button. FIG. 6(b) is a waveform diagram of an induced electric field, it shows while a physical contact activated, of which a touch sensor 10 is a touch button. It can be clearly seen from the drawings that as the touch sensor 10 receives a touch input, the signal increases more than three times in amplitude. Therefore, the signal judgment circuit 3 may easily determine whether there is a touch input from the touch sensor 10. The way of the signal judgment circuit 3 determining the touch input is as follows. For example, the signal judgment circuit 3 may compare the amplified induced electric field signal with a reference voltage after peak value sampling, in which if the amplified induced electric field signal after peak value sampling is larger than the reference voltage, it is determined that the touch sensor 10 receives a touch input, and the signal judgment circuit 3 outputs a signal. If it is desired to do noise filtration of the signal, a capacitor 4 may be added as shown in FIG. 2, thereby making the waveform of the touch signal output by the signal judgment circuit 3 be more complete. The waveform diagrams are shown in FIGS. 7(a) and 7(b).

Figure 8A:
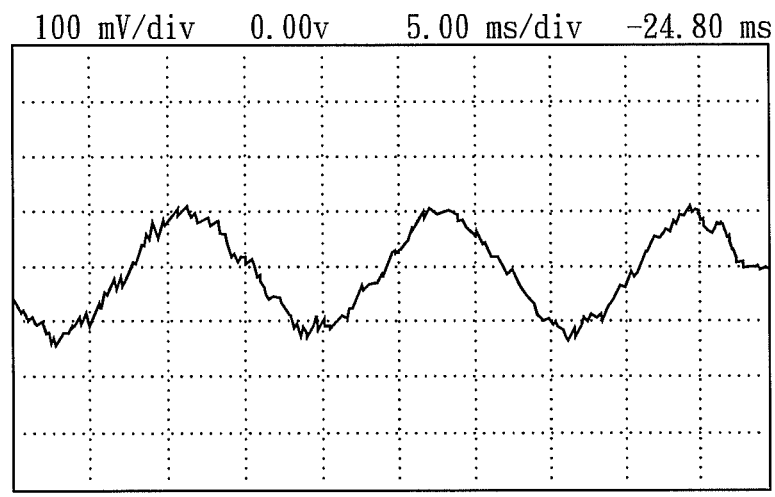
FIG. 8(a) is a fifth waveform diagram of the capacitive touch sensing device in accordance with a preferred embodiment of the invention.
Figure 8B:
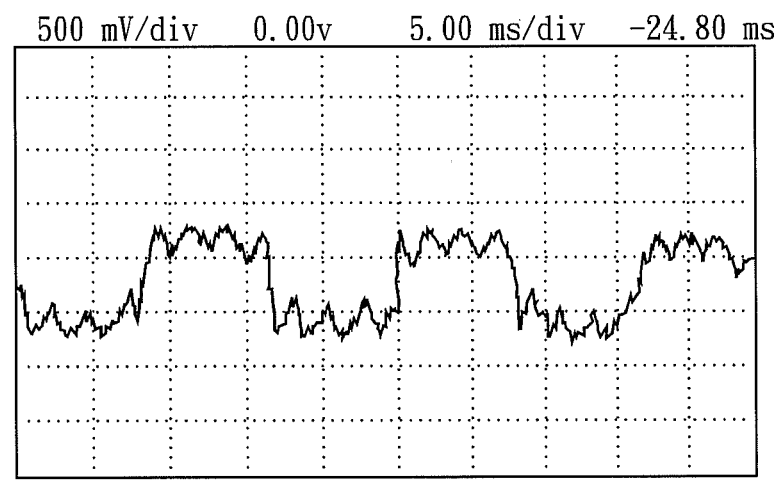
FIG. 8(b) is a sixth waveform diagram of the capacitive touch sensing device in accordance with a preferred embodiment of the invention.
Figure 9A:
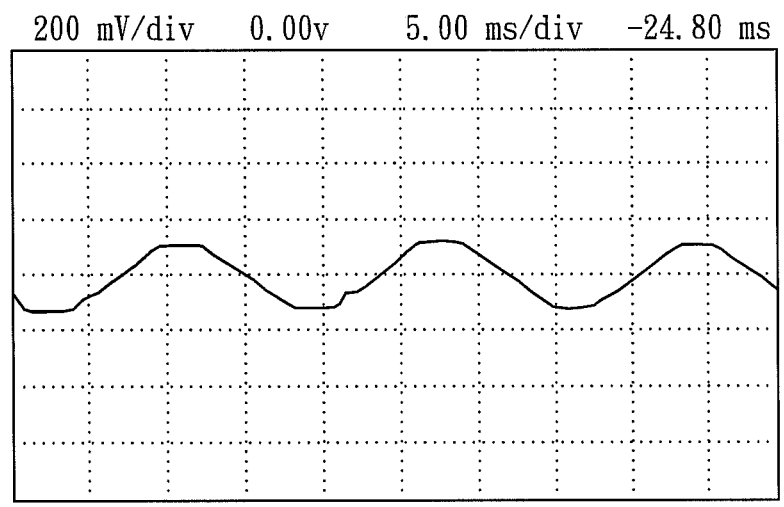
FIG. 9(a) is a seventh waveform diagram of the capacitive touch sensing device in accordance with a preferred embodiment of the invention.
Figure 9B:
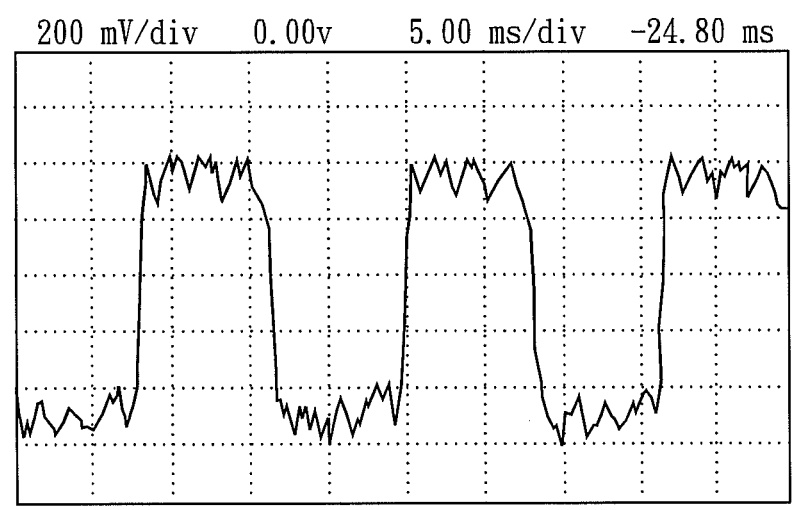
FIG. 9(b) is an eighth waveform diagram of the capacitive touch sensing device in accordance with a preferred embodiment of the invention.

In addition, another kinds of the touch sensor 10 may have the same effect. Please refer to FIGS. 8(a) and 8(b). FIG. 8(a) is a waveform diagram of an induced electric field, it shows while without any physical contact, of which a touch sensor 10 is a slider. FIG. 8(b) is a waveform diagram of an induced electric field, it shows while a physical contact activated, of which a touch sensor 10 is a slider. It can be clearly seen from the drawings that as the touch sensor 10 receives a touch input, similarly, the signal increases more than three times in amplitude. Therefore, the signal judgment circuit 3 may easily judge whether there is a touch input from the touch sensor 10. Similarly, if it is desired to do noise filtration of the signal, a capacitor 4 may be added as shown in FIG. 2, making the waveform of the touch signal output by the signal judgment circuit 3 to be more complete. The waveform diagrams are shown in FIGS. 9(a) and 9(b).

It may be known from the above description that through the explanation of the capacitive touch sensing device of the invention, via the measurement of the variation of the electric field, it can easily determine whether there is a touch input from the touch sensor 10. As such, the capacitive touch sensing device provided by the invention may be used to go with touch button, slider, shuttle, panels and the like. In addition, the capacitive touch sensing device provided by the invention measures the touch position of the touch panel according to the induced electric field. Therefore, even if the user wears gloves, it may accurately measure the touch position.

Figure 10:
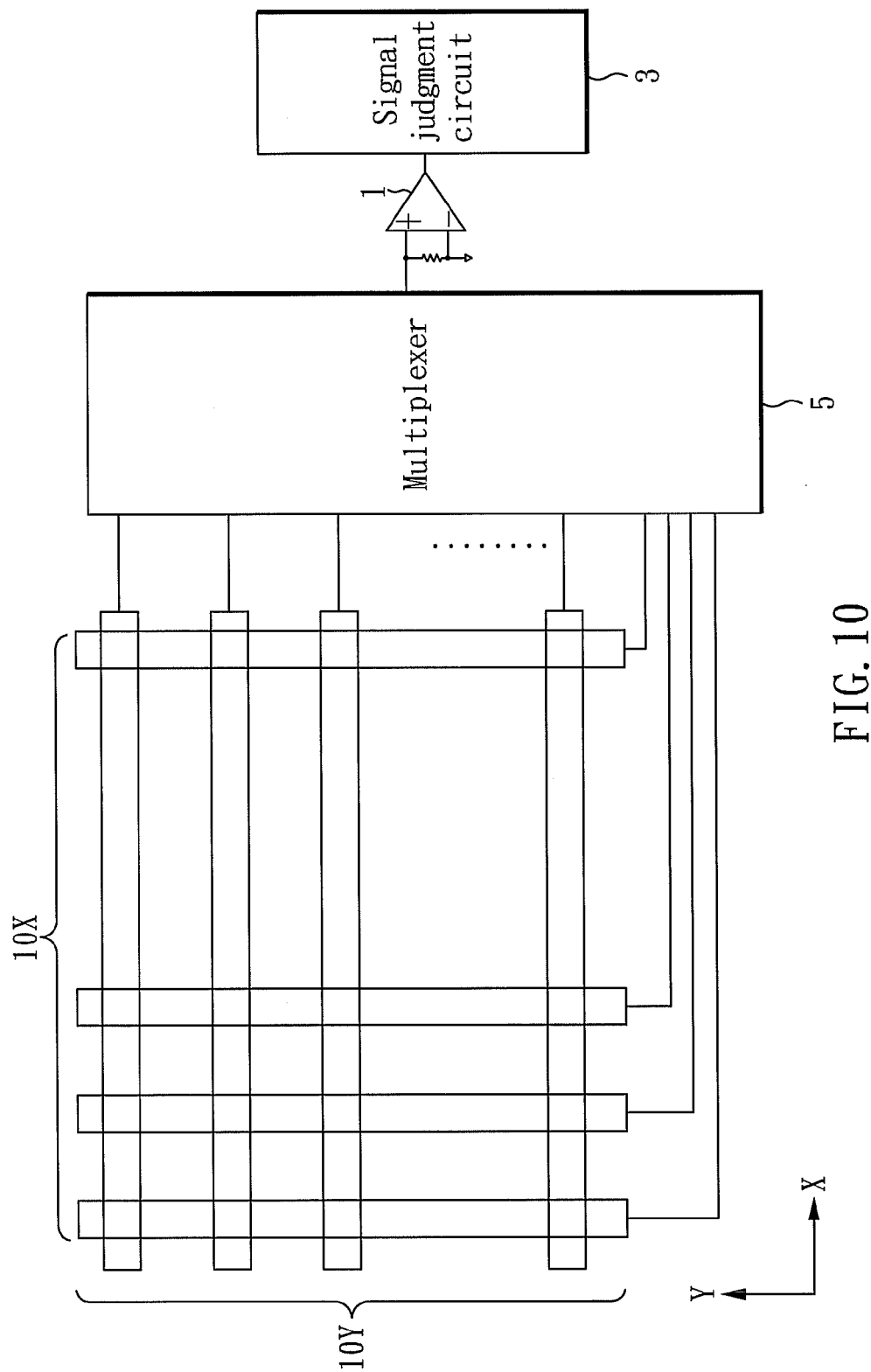
FIG. 10 is a circuit structure diagram of the capacitive touch sensing device in accordance with a further preferred embodiment of the invention.

Furthermore, the capacitive touch sensing device according to the invention may expand from one having a single point touch detection to that having a two-dimension plane touch detection. Please refer to FIG. 10. The invention provides plural sets of conductive wires 10X and 10Y installed side by side respectively along an X axis and a Y axis, while the X axis and the Y axis are orthogonal. One end of each conductive wires 10X and 10Y is connected to a multiplexer 5. The multiplexer 5 is electrically connected to the differential amplifier 1 and the differential amplifier 1 is electrically connected to the signal judgment circuit 3. Through the multiplexer 5, each of the conductive wires 10X arranged sequentially along the X direction and each of the conductive wires 10Y arranged sequentially along the Y direction may receive an induced electric field signal. The differential amplifier 1 amplifies the received signal and transfers the same to the signal judgment circuit 3 for determining the induced electric field value after amplification and further determining the touch position of the touch panel.

Although the present invention has been explained in relation to its preferred embodiment, it is to be understood that many other possible modifications and variations can be made without departing from the scope of the invention as hereinafter claimed.

What is claimed is:
1. A capacitive touch sensing device by detecting induced electric field, comprising:
a differential amplifier having a first input end, a second input end and an output end;
a resistor having two ends electrically connected to the first input end and the second input end of the differential amplifier, respectively; and
a signal judgment circuit electrically connected to the output end of the differential amplifier,
wherein the first input end of the differential amplifier is electrically connected to a touch sensor, the second input end of the differential amplifier is connected to circuit ground, and as the touch sensor receives an induced electric field signal, the induced electric field signal is amplified by the differential amplifier and the induced electric field signal after amplification is then determined by the signal judgment circuit,
wherein the signal judgment circuit includes:
zero potential triggering circuit electrically connected to the output end of the differential amplifier, in which as the amplified induced electric field signal is at a zero potential, the zero potential triggering circuit generates a triggering signal;
a delay circuit electrically connected to the zero potential triggering circuit for correspondingly receiving the triggering signal and delaying the triggering signal a period of time for output; and
a comparator electrically connected to the delay circuit to compare the amplified induced electric field signal with a reference voltage upon receiving the delayed triggering signal from the delay circuit, in which if the amplified induced electric field signal is larger than the reference voltage, it outputs a signal.

2. The capacitive touch sensing device by detecting induced electric field as claimed in claim 1, further comprising a capacitor electrically connected to the first input end and the second input end of the differential amplifier.

3. The capacitive touch sensing device by detecting induced electric field as claimed in claim 1, wherein the resistor is a high impedance resistor.

4. The capacitive touch sensing device by detecting induced electric field as claimed in claim wherein the touch sensor is a touch sensing button, a slider, a shuttle or a touch panel.

5. The capacitive touch sensing device by detecting induced electric field as claimed in claim 1, wherein the first input end is a positive input end and the second input end is a negative input end.

6. A capacitive touch sensing device by detecting induced electric field, comprising:
a multiplexer;
a plurality of first conductive wires arranged sequentially along a first direction, each being electrically connected to the multiplexer;
a plurality of second conductive wires arranged sequentially along a second direction, each being electrically connected to the multiplexer;
a differential amplifier electrically connected to the multiplexer; and
a signal judgment circuit electrically connected to the differential amplifier,
wherein the plurality of first conductive wires and the plurality of second conductive wires are electrically connected to the differential amplifier via the multiplexer, and as one of the plurality of first conductive wires and one of the plurality of second conductive wires receive an induced electric field signal, the multiplexer, being connected thereto, transfers the induced electric field signal to the differential amplifier for amplification and the amplified induced electric field signal is determined by the signal judgment circuit, wherein the signal judgment circuit includes:
a zero potential triggering circuit electrically connected to the output end of the differential amplifier, in which as the amplified induced electric field signal is at a zero potential, the zero potential triggering circuit generates a triggering signal;
a delay circuit electrically connected to the zero potential circuit for correspondingly receiving the triggering signal and delaying the triggering signal a period of time for output; and
a comparator electrically connected to the delay circuit to compare the amplified induced electric field signal with a reference voltage upon receiving the delayed triggering signal from the delay circuit, in which if the amplified induced electric field signal is larger than the reference voltage, it outputs a signal.

7. The capacitive touch sensing device by detecting induced electric field as claimed in claim 6, wherein the first direction and the second direction are orthogonal.

8. A capacitive touch sensing device by detecting induced electric field, comprising:
a differential amplifier having a first input end, a second input end and an output end;
a resistor having two ends electrically connected to the first input end and the second input end of the differential amplifier, respectively; and
a signal judgment circuit electrically connected to the output end of the differential amplifier,
wherein the first input end of the differential amplifier is electrically connected to a touch sensor, the second input end of the differential amplifier is connected to circuit ground, and as the touch sensor receives an induced electric field signal, the induced electric field signal is amplified by the differential amplifier and the induced electric field signal after amplification is then determined by the signal judgment circuit,
wherein the signal judgment circuit includes:
a zero potential triggering circuit electrically connected to the output end of the differential amplifier, in which as the amplified induced electric field signal is at a zero potential, the zero potential triggering circuit generates a triggering signal;
a microcontroller electrically connected to the zero potential triggering circuit for receiving the triggering signal and correspondingly outputting a delayed triggering signal; and
an analog/digital converter electrically connected to the output end of the differential amplifier and to the microcontroller, in which as the analog/digital converter receives the delayed triggering signal from the microcontroller, the analog/digital converter proceeds with sampling with respect to the amplified induced electric field signal and outputs a digital value to the microcontroller.

9. The capacitive touch sensing device by detecting induced electric field as claimed in claim 8, further comprising a capacitor electrically connected to the first input end and the second input end of the differential amplifier.

10. The capacitive touch sensing device by detecting induced electric field as claimed in claim 8, wherein the resistor is a high impedance resistor.

11. The capacitive touch sensing device by detecting induced electric field as claimed in claim 8, wherein the touch sensor is a touch sensing button, a slider, a shuttle or a touch panel.

12. The capacitive touch sensing device by detecting induced electric field as claimed in claim 8, wherein the first input end is a positive input end and the second input end is a negative input end.

13. A capacitive touch sensing device by detecting induced electric field, comprising:
a multiplexer;
a plurality of first conductive wires arranged sequentially along a first direction, each being electrically connected to the multiplexer;
a plurality of second conductive wires arranged sequentially along a second direction, each being electrically connected to the multiplexer;
a differential amplifier electrically connected to the multiplexer; and
a signal judgment circuit electrically connected to the differential amplifier,
wherein the plurality of first conductive wires and the plurality of second conductive wires are electrically connected to the differential amplifier via the multiplexer, and as one of the plurality of first conductive wires and one of the plurality of second conductive wires receive an induced electric field signal, the multiplexer, being connected thereto, transfers the induced electric field signal to the differential amplifier for amplification and the amplified induced electric field signal is determined by the signal judgment circuit,
wherein the signal judgment circuit includes:
a zero potential triggering circuit electrically connected to the output end of the differential amplifier, in which as the amplified induced electric field signal is at a zero potential, the zero potential triggering circuit generates a triggering signal;
a microcontroller electrically connected to the zero potential triggering circuit for receiving the triggering signal and correspondingly outputting a delayed triggering signal; and
an analog/digital converter electrically connected to the output end of the differential amplifier and to the microcontroller, in which as the analog/digital converter receives the delayed triggering signal from the microcontroller, the analog/digital converter proceeds with sampling with respect to the amplified induced electric field signal and outputs a digital value to the microcontroller.

14. The capacitive touch sensing device by detecting induced electric field as claimed in claim 13, wherein the first direction and the second direction are orthogonal.

* * * * *